United States Patent [19]

Pfleger et al.

[11] Patent Number: 4,794,004

[45] Date of Patent: * Dec. 27, 1988

[54] PREPARATION OF COPOLYMERS OF ETHYLENE WITH VINYL ESTERS IN A TUBULAR REACTOR AT ABOVE 500 BAR

[75] Inventors: Klaus Pfleger; Klaus Boettcher, both of Wesseling; Oskar Buechner, Dudenhofen; Friedrich Kanne; Siegfried Kursawe, both of Wesseling, all of Fed. Rep. of Germany

[73] Assignee: BASF Aktiengesellschaft, Ludwigshafen, Fed. Rep. of Germany

[*] Notice: The portion of the term of this patent subsequent to Nov. 29, 2005 has been disclaimed.

[21] Appl. No.: 41,231

[22] Filed: Apr. 22, 1987

[30] Foreign Application Priority Data

May 9, 1986 [DE] Fed. Rep. of Germany ....... 3615563

[51] Int. Cl.$^4$ .................. C08F 220/40; C08F 2/38; C08F 2/00
[52] U.S. Cl. ............................ 526/64; 526/79; 526/86; 526/87; 526/88; 526/331
[58] Field of Search ............ 526/64, 88, 331, 79, 526/86, 87

[56] References Cited

U.S. PATENT DOCUMENTS

| | | | |
|---|---|---|---|
| 3,725,378 | 4/1973 | Chamberlin | 526/64 |
| 3,917,577 | 11/1975 | Trieschmann et al. | 526/64 |
| 4,042,767 | 8/1977 | Payer et al. | 526/64 |
| 4,048,411 | 9/1977 | Mietzner et al. | 526/64 |
| 4,135,044 | 1/1979 | Beals | 526/64 |
| 4,579,918 | 4/1986 | Metzger et al. | 526/64 |

FOREIGN PATENT DOCUMENTS

| | | | |
|---|---|---|---|
| 0175316 | 3/1986 | European Pat. Off. | 526/64 |
| 2617412 | 11/1977 | Fed. Rep. of Germany | 526/64 |

*Primary Examiner*—Joseph L. Schofer
*Assistant Examiner*—F. M. Teskin
*Attorney, Agent, or Firm*—Keil & Weinkauf

[57] ABSTRACT

Copolymers of ethylene with vinyl esters are prepared in a continuously operated tubular polymerization system at high pressure and temperatures by feeding a mixture of ethylene, vinyl ester, initiator and, if appropriate, regulant into the polymerization system in the form of a mainstream at the inlet point thereof and at the same time through two or more secondary streams downstream of the inlet point, secondary streams (I) being metered in at points where the reaction temperature has just exceeded a maximum temperature due to the heat of polymerization and secondary streams (II) at points which, relative to the direction of flow of the ethylene, are upstream of the feed points of secondary streams (I) and upstream of the respective maximum temperature.

5 Claims, No Drawings

PREPARATION OF COPOLYMERS OF ETHYLENE WITH VINYL ESTERS IN A TUBULAR REACTOR AT ABOVE 500 BAR

The present invention relates to a process for preparing copolymers of ethylene with vinyl esters by copolymerizing 100 parts by weight of ethylene with from 0.1 to 30 parts by weight of a vinyl ester in a continuously operated tubular polymerization system at pressures of from 500 to 5000 bar and temperatures of from 50° to 450° C. in the presence of a polymerization initiator which decomposes into free radicals, by feeding a mixture of ethylene, vinyl, ester, initiator and, if appropriate, regulant into the polymerization system in the form of a main stream at the inlet point thereof and at the same time in the form of two or more secondary streams downstream of the inlet point along the polymerization system.

It is known in the high pressure polymerization of ethylene to divide the ethylene stream into a plurality of bleed streams and to introduce the main stream, after heating to initiation temperature, into the initial part of a tubular reactor. In this known process, the other secondary stream or streams are then fed into the reactor at a plurality of successive points in the direction of flow of the ethylene to be polymerized. In this process, the cold ethylene is introduced into the reactor at or shortly downstream of the points where the polymerization mixture in the reactor has exceeded the maximum allowable polymerization temperature and the temperature of the ethylene which is introduced cold and which likewise contains initiator is set in such a way that, after mixing into the reactor, the temperature does not drop below the temperature required to initiate the polymerization of the ethylene, which depends on the catalyst used (cf. GB Pat. Nos. 1,010,847, 915,210 and 1,347,361).

In this way it is possible to increase the conversion of ethylene to polyethylene per pass. With this known process, small amounts of atmospheric oxygen are added as polymerization initiator to the ethylene, for example before or after compression. Instead of atmospheric oxygen it is also possible to add peroxides or hydroperoxides or mixtures thereof (cf. U.S. Pat. No. 3,725,378).

These existing processes have the disadvantage either of producing products of insufficient resistance to stress crack corrosion or of necessitating uneconomical operation if the products having proved stress crack corrosion resistant are to be obtained. Existing processes are uneconomical since, on adding the vinyl ester predominantly to the mainstream, which should theoretically produce the best products in terms of stress crack corrosion resistance, the regulant action of the comonomer leads to products havng a high melt flow index, which, owing to their high proportion of low molecular weight polymer, are unsuitable in respect of stress crack corrosion resistance; countermeasures are therefore necessary to reduce the initiator concentration and/or the reaction temperature, which reduces the yield severely.

It is an object of the present invention to provide a process for copolymerizing ethylene with a vinyl ester in a tubular polymerization system which, without sacrificing the high conversion, improves the mechanical strength and in particular the resistance to stress crack corrosion of products produced from the copolymer.

We have found that this object is achieved with a process as claimed in claim 1 or 2 or 3 or 4 or 5.

For the purposes of the present invention, an ethylene/vinyl ester copolymer is a copolymer of ethylene which is preparable under the stated temperature and pressure conditions, preferably at a pressure of from 1500 to 3000 bar and at a temperature of from 150° to 350° C. The term ethylene/vinyl ester copolymers includes copolymers containing copolymerized comonomer in an amount of from 0.2 to 30.0, preferably from 0.5 to 20.0, percent by weight which have a melt flow index of from 0.1 to 25 g/10 min, determined in accordance with ASTM-D 1238-65 T at 190° C. under a load of 2.16 kg, and a density of from 0.890 to 0.934 g/cm$^3$, measured in accordance with DIN 53,479. Ethylene/vinyl acetate copolymers and processes for their preparation in tubular polymerization systems from the monomers are described for example in U.S. Pat. No. 4,048,411, DE Pat. No. 2,617,412 or EP-A-175,316.

Suitable vinyl esters are all the vinyl esters which are copolymerizable with ethylene under the stated temperature and pressure conditions. These comonomers are for example vinyl esters of carboxylic acids of 1 to 8, preferably 1 to 6, carbon atoms. Vinyl acetate is particularly preferred.

The ethylene is copolymerized with the vinyl ester in the presence of a free radical initiator. For the purposes of the present invention, free radical polymerization initiators are those catalysts which are also used for the homopolymerization of ethylene under high pressure. An example of a suitable free radical initiator is oxygen, expediently in an amount of from 2 to 100 mol-ppm, based on the ethylene to be polymerized. Also suitable are peroxides and other free radical producers and also mixtures of peroxides which have different decomposition points, as well as hydroperoxides and mixtures of oxygen and peroxides and/or hydroperoxides. Specific examples of peroxides and hydroperoxides are: tert-butylperoxy pivalate, di-tert-butyl peroxide, tert-butyl hydroperoxide, tert-butyl perbenzoate, p-methane hydroperoxide and dilauroyl peroxide. Free radical polymerization initiators is also to include compounds such as azobisisobutyrodinitrile. It is also possible to use mixtures of oxygen and one or more peroxides. Preferably the copolymerization of ethylene with vinyl esters is initiated with atmospheric oxygen.

It is possible to work in the presence of a polymerization regulant. With the aid of polymerization-regulants it is possible to set the melt flow index of the resulting ethylene copolymers. Suitable regulants are for example hydrogen, ketones, aldehydes, alcohols, ethers or normal or branched hydrocarbons. It is preferable to use propane, propylene, methyl ethyl ketone or propionaldehyde. The polymerization regulant is in general used in an amount of from 0.2 to 5 mole percent, based on the ethylene to be polymerized. In a particular embodiment of the process, no additional polymerization regulant is employed, since the vinyl ester used has regulant properties.

The copolymerization is in general carried out in the absence of solvent. The small amounts of inert solvent, such as benzene, mineral oil or any other inert solvent, in which the polymerization initiator is dissolved are negligible compared with the other feed materials. If oxygen is used as polymerization initiator, no solvent is required.

The process can be carried out using a customary continuously operated tubular high pressure polymerization system (a tubular reactor). Tubular reactors are tubular polymerization vessels whose length to diameter ratio of the pressure-resistant tubes ranges from 10,000 to 60,000:1. Details of ethylene high pressure polymerization processes employing tubular reactors can be found for example in Ullmann's Encyklopädie der technischen Chemie, volume 19 (1980), 4th edition, pages 167 to 178, Verlag Chemie GmbH, D-6940 Weinheim.

In existing processes, the gaseous mixture of ethylene, vinyl ester, initiator and if necessary regulant is fed into the reactor at the inlet point and at the same time at a second point downstream of the inlet point along the tubular reactor in the direction of flow of the ethylene to be polymerized, where the reaction temperature has exceeded a maximum. An inlet point is in general to be understood as meaning the initial part of the tubular reactor. In these existing processes, it is the main stream which is introduced in the initial part of the reactor, while the secondary stream is fed into the reactor in a conventional manner at a point downstream of which a temperature peak develops. The result of this measure is the known reaction system of the two-zone tubular reactor.

In the process of the invention, then, the improvement comprises feeding in secondary streams (I) at points where the reaction temperature has just exceeded a maximum temperature due to the heat of polymerization and secondary streams (II) at points which, relative to the direction of flow of the ethylene, are positioned upstream of the feed points of secondary streams (I) and upstream of the respective maximum temperature. A preferred procedure comprises feeding in a secondary stream (I) at a point where the reaction temperature has just exceeded a maximum temperature and a secondary stream (II) upstream of this maximum temperature. This procedure is employable in two-zone reactors, the secondary stream (II) being additionally fed into the running reaction upstream of the maximum temperature. Preferably, in the process according to the invention, the secondary stream (I) is introduced at a point where the reaction mixture in the tubular reactor has a temperature of from 270° to 290° C. and the secondary stream (II) at a point upstream thereof where the reaction mixture is from 30° to 60° C., in particular from 45° to 55° C., cooler than the maximum temperature. Particular preference is also given to a procedure where the amount of vinyl ester required for copolymerization is predominantly fed in by way of the main stream and secondary stream II.

The ratio of the gaseous main stream: secondary stream I: secondary stream II is maintained within the range of from 10:9:1 to 10:5:5. In the passing in of secondary stream (II) into the reactor, preferably at a temperature of the reaction mixture of from 240° to 260° C., the temperature of the mixture is initially reduced to from 210° to 240° C. and then reaches maxima of from 290° to 310° C., in particular from 300° to 310° C.

Through the measure according to the invention it is possible to obtain an improvement in the mechanical strength, in particular an improvement in the resistance to stress crack corrosion, of products produced from the ethylene/vinyl ester copolymer.

According to the Examples, the ethylene had the stated amount of oxygen and comonomer added to it in two separate gas streams and was compressed to the reaction pressure of 2,300 bar. A secondary stream (II) was branched off before the unification of the compressed gas streams and was fed into the running reaction at a feed point upstream of the maximum temperature, while another secondary stream (I) was fed in at a short distance downstream of the maximum temperature; the main stream was fed in at the reactor intake point. Tubular reactors of known design were used. In the case of the two-zone reactor, the feed point for secondary stram (II) is upstream of the maximum temperature of the first reaction zone; it is also possible to employ one feed point each for the two reaction zones upstream of the respective maximum temperature.

The reactor had a length/diameter ratio of about 10,500:1. To remove some of the heat of polymerization, the tube walls were cooled from the outside with water. In carrying out the Comparative Example, the corresponding amount of vinyl ester was added only to the main gas stream and to secondary stream I; no secondary stream II was employed. The copolymer obtained was separated off from unconverted monomer in a conventional manner in separators downstream of the reactor.

EXAMPLES

The copolymerization of ethylene with vinyl acetate was carried out in all cases in a tubular reactor. The ethylene had the stated amount of oxygen and comonomer added to it in separate gas streams and was compressed to the reaction pressure. Under a reaction pressure of 2300 bar, measured at the reactor entrance, the reaction mixture reached a temperature of 255° C. upstream of the 1st feed point as a result of the heat of reaction, passed after addition of secondary stream II through a temperature range of from 215° to 230° C. and thereafter attained a maximum temperature of 302° C. in the middle of the reaction zone at the 2nd feed point. The following amounts of vinyl acetate (VAc) and oxygen were metered into the gas streams:

|  | Main stream | | Secondary stream | | | |
| --- | --- | --- | --- | --- | --- | --- |
|  | | | I | | II | |
| Example | VAc (kg) | $O_2$ (mol-ppm) | VAc (kg) | $O_2$ (mol-ppm) | VAc (kg) | $O_2$ (mol-ppm) |
| 1 | 400 | 12.2 | 500 | 10.1 | 150 | 10.1 |
| 2 | 560 | 14.0 | 325 | 12.4 | 175 | 12.4 |
| Comp. 1 | 450 | 8.7 | 550 | 9.5 | 0 | 0 |
| Comp. 2 | 900 | 7.8 | 300 | 8.0 | 0 | 0 |

$O_2$ (mol-ppm) = amount is based on the respective ethylene stream

The properties of the copolymers obtained and the conversions obtained for the reactor settings specified for the Examples are tubulated below.

| | Properties of copolymers | | | | |
| --- | --- | --- | --- | --- | --- |
| Example | Conversion (% by weight) | MFI (g/10 min) | Density (g/cm³) | VAc content (% by weight) | Stress crack corrosion resistance |
| 1 | 24.8 | 3.92 | 0.9313 | 12.3 | 500–2000 h |
| 2 | 26.5 | 4.23 | 0.9306 | 12.8 | >2500 h |
| Comp. 1 | 23.0 | 4.43 | 0.9327 | 13.2 | 50–450 h |

-continued

| | Properties of copolymers | | | | |
|---|---|---|---|---|---|
| Example | Conversion (% by weight) | MFI (g/10 min) | Density (g/cm$^3$) | VAc content (% by weight) | Stress crack corrosion resistance |
| Comp. 2 | 20.5 | 4.35 | 0.9334 | 12.5 | 100–800 h |

Conversion: given in % by weight, based on the total amount of reaction mixture fed into the reactor
MFI = melt flow index, in g/10 min, measured in accordance with DIN 53,735
Density: g/cm$^3$, measured in accordance with DIN 53,479
VAc content: amount of vinyl acetate copolymerized in copolymer, in % by weight.
Stress crack corrosion resistance: Test of resistance to stress crack formation in accordance with the Bell Telephone Test as per ASTM D 1693; lives of test specimens given in hours.

We claim:

1. A process for preparing a copolymer of ethylene with a vinyl ester by copolymerizing 100 parts by weight of ethylene with from 0.1 to 30.0 parts by weight of vinyl ester in a continuously operated tubular polymerization reactor at pressures of from 500 to 5,000 bar and at temperatures of from 50° to 450° C. in the presence of a polymerization initiator which decomposes into free radicals, which process further comprises: feeding a mixture of ethylene, vinyl ester and initiator into the tubular polymerization reactor in the form of a main stream at the inlet point of the reactor; passing said mixture along said reactor where the ethylene and vinyl ester polymerize to form a copolymer; feeding into the reactor an additional amount of said mixture in one or more secondary streams(I) at a point or points where a maximum temperature is reached in the reactor due to the heat of polymerization, and feeding a further amount of said mixture into the reactor in one or more secondary streams(II) at a point or points which, relative to the direction of flow of the ethylene, are positioned upstream of the feed points of secondary streams(I) and upstream of the points at which a maximum temperature is reached in the reactor.

2. The process of claim 1, wherein a secondary stream (I) is fed in at a point where a maximum temperature is reached and a secondary stream (II) is fed in upstream of this maximum temperature.

3. The process of claim 1, wherein secondary stream (I) is fed in at a point where the reaction mixture has a temperature of from 270° to 290° C. and secondary stream (II) is fed in at a point upstream thereof where the reaction mixture is cooler by from 30° to 60° C.

4. The process of claim 1, wherein the amount of vinyl ester required for copolymerization is predominantly fed in the mainstream and secondary stream (II).

5. The process of claim 1, wherein the mixture further contains a polymerization regulant.

* * * * *